United States Patent [19]

Westropp

[11] Patent Number: 4,683,710
[45] Date of Patent: Aug. 4, 1987

[54] PROTECTIVE EQUIPMENT FOR HORSES

[75] Inventor: Hilary A. Westropp, Fairview, Saltby, Melton Mowbray, Leicestershire, England

[73] Assignee: Hilary Ann Westropp, Leicestershire, England

[21] Appl. No.: 831,629

[22] Filed: Feb. 21, 1986

[51] Int. Cl.[4] ............................................. B68C 5/00
[52] U.S. Cl. .......................................... 54/82; 168/18
[58] Field of Search ................. 54/82; 168/1, 18, 19; 36/111

[56] References Cited

U.S. PATENT DOCUMENTS

| | | | |
|---|---|---|---|
| 1,036,750 | 8/1912 | Tuttle | 54/82 |
| 3,286,441 | 11/1966 | Eanes | 54/82 |
| 3,800,504 | 4/1974 | Gregory | 54/82 |

FOREIGN PATENT DOCUMENTS 1580779  12/1980  United Kingdom .................... 54/82

*Primary Examiner*—Robert P. Swiatek
*Attorney, Agent, or Firm*—Spensley Horn Jubas & Lubitz

[57] ABSTRACT

The invention relates to an over-reach boot for horses, ponies and the like to protect the animals's forelegs from kicks by its rear legs. The boot comprises a number of strips or panels (4) which preferably overlap and which are provided at their upper portions (13) with loops (14) and apparatus (16) by which a desired number of panels (4) are threaded onto a strap (6) which is fastened around the foreleg with a non-slip buckle (8).

14 Claims, 4 Drawing Figures

PROTECTIVE EQUIPMENT FOR HORSES

The invention is concerned with improvements in or relating to protective equipment for horses, ponies and the like, particularly boots of the type known as over-reach boots.

It frequently occurs when a horse or pony strikes a foreleg with one of its hind legs resulting in injury, that is, bruising or even severe lacerations. A common solution to this problem is a protective boot in the form of a rubber cuff or spat worn about the animal's pastern bone and including a skirt portion extending so as partially to cover the hoof.

These cuffs are not found entirely satisfactory in use since they tend to become inverted if the animal gallops in mud or water which forces its way beneath the cuff and lifts it. Moreover should the animal stand on the lower edge of the skirt portion, the latter tears or comes off and the cuff then requires replacement to retain its effectiveness.

It is an object of the present invention to minimize the above disadvantages by an improved overreach boot.

The invention provides an article of protective equipment for horses, ponies and the like comprising a boot adapted to be worn on a lower portion of a foreleg thereof and comprising a leg encircling portion and a skirt portion comprising a plurality of strips or panels, said skirt portion depending from the leg encircling portion.

Advantageously, the strips or panels of the skirt portion are arranged in overlapping side-by-side relationship to one another. Preferably the overlapping portion of each strip or panel is sufficient that despite relative movement in use between adjacent panels, no gaping occurs. In an example, the distance by which one panel overlaps its neighbour is approximately equal to half a panel width.

Preferably the strips or panels are initially formed separately and a desired number thereof are assembled to form the skirt portion and fastened together at upper portions thereof by a suitable strap or other elongate fastening means to form the leg encircling portion. Advantageously means are provided to maintain the strips or panels in their correct positional spacing in relation to the fastening means, that is, bunching of the strips or panels is largely prevented.

In an example of an overreach boot according to the invention the fastening means comprises a strap passing through loops formed in upper end portions of the strips or panels, each loop passing through an aperture in the overlapping upper end portion of the neighbouring strip or panel.

Advantageously, the opposite, lower, end portion of each strip or panel is provided with at least one transversely by extending line of weakness. Conveniently these lines comprise grooves formed to reduce the thickness of the strip or panel in a localised manner. This provision enables the overall length of the skirt portion readily to be shortened if to be worn by a relatively small animal, and/or to provide controlled tearing of the skirt portion to avoid undue reduction in its effectiveness as protective equipment. The lines of weakness also act to reduce the risk of the animal tripping or stumbling as might occur if the skirt portion was too tough to tear readily. It will be appreciated that any damaged strips or panels may be replaced individually and it is convenient therefore if all the strips or panels are identical in shape so as to be interchangeable.

There will now be described an example of an article according to the invention. It will be understood that the description which is to be read with reference to the drawings is given by way of example only and not by way of limitation.

Figure 1:
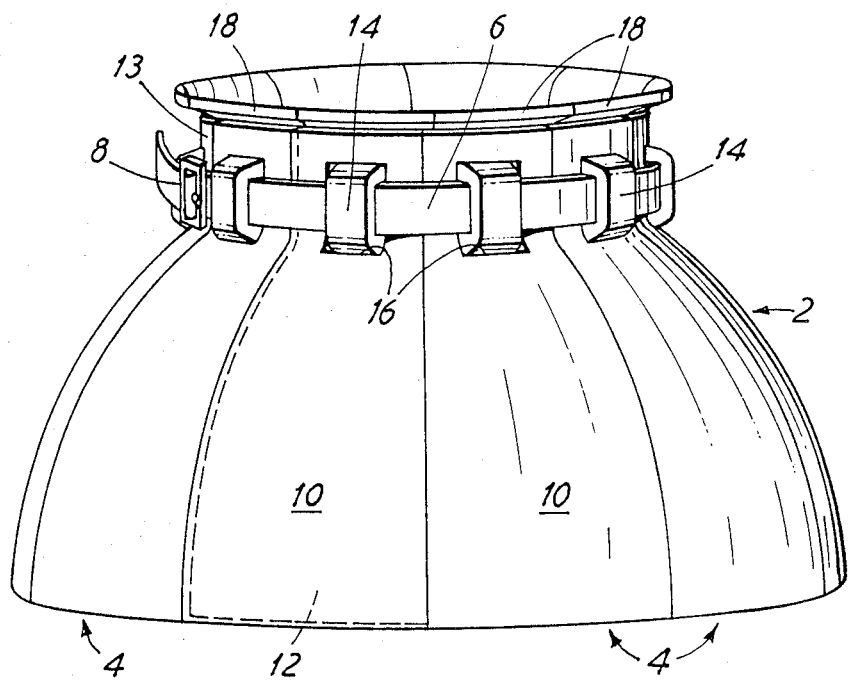
FIG. 1 is a side view of an overreach boot.
Figure 2:
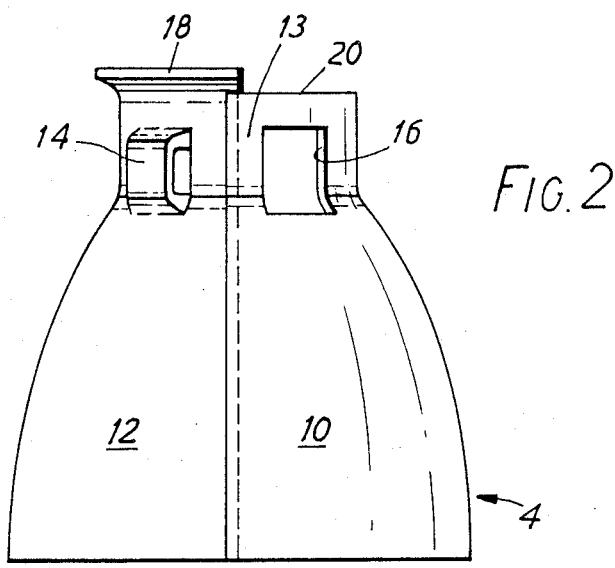
FIGS. 2 and 3 are front and rear views respectively of one panel of the boot of FIG. 1.
Figure 3:
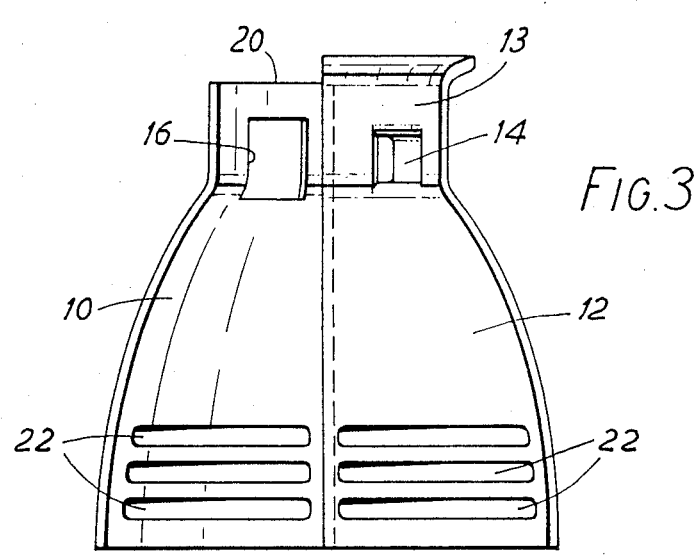
Figure 4:
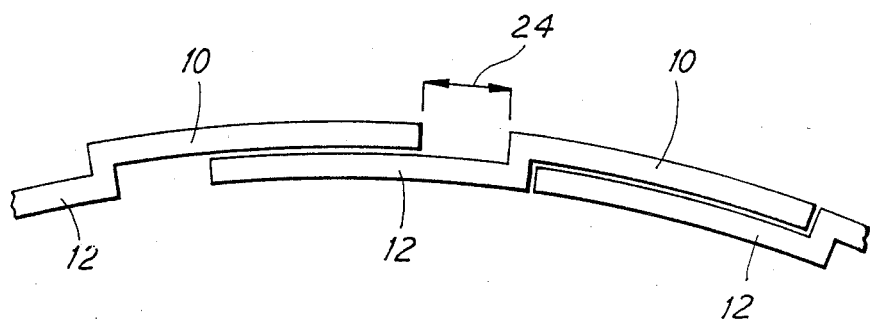
FIG. 4 is a fragmentary view of end portions of adjacent panels.

FIG. 1 illustrates a boot comprising a skirt portion indicated at 2 and having the shape of an inverted bowl. A plurality of identical skirt panels 4, moulded from natural or synthetic rubber, are secured together at upper end portions thereof by a fastening means comprising a strap 6 having a non-slip buckle 8. Each panel 4 comprises two lengthwise extending portions 10 and 12. As may be clearly seen from FIG. 4, the portion 10 comprises the normally outwardly visible portion of each panel 4 and portion 12 comprises an inwardly orientated portion only visible when the skirt moves in use, since each portion 12 is overlapped by the portion 10 of the adjacent panel.

The upper end portion 13 of each panel 4 is of reduced width and is provided with an outwardly projecting loop 14 arranged to be passed through an aperture 16 provided in the adjacent panel, when the skirt portion is assembled. The strap 6 then passes through the loops 14 and the boot may then be fastened about the animal's pastern bone and secured by the buckle 8 which when fastened is received within the area between loops. Unwanted relative movement between the panels is further minimized by providing a lip 18 on the upper portion of panel portion 12 above the loop 14, said lip abutting the upper edge 20 of the portion 10 of the adjacent panel.

Provided in the opposite lower end portion of the panel 4 are a plurality of transverse grooves 22, which provide easily tearable lines of weakness. As explained these provide controlled tearing properties.

In use, the adjacent panels 4 may move apart slightly at their lower edges to form gaps 24 (FIG. 4) but the extent of the overlap will be selected to prevent actual spaces therebetween through which a rear hoof may strike.

Various modifications may be made within the scope of the invention as defined in the following claims.

I claim:

1. An article of protective equipment for horses, ponies and the like comprising:
    a boot adapted to be worn on a lower portion of a foreleg thereof;
    a leg encircling portion; and
    a skirt portion comprising a plurality of strips or panels, said skirt portion including an upper portion and lower portion, said upper portion depending from the leg encircling portion, said lower portion hanging lossely about said foreleg.

2. An article as claimed in claim 1 wherein the strips or panels of the skirt portions are arranged in overlapping side-by-side relationship to one another.

3. An article as claimed in claim 1 wherein the strips or panels of the skirt portions are arranged to overlap one another by a distance substantially equal to half the width of a strip or panel.

4. An article as claimed in claim 1 wherein the plurality of strips or panels are fastened together at one end to form said leg encircling portion.

5. An article as claimed in claim 1 wherein said lower of said skirt portion is provided with at least one transversely extending line of weakness.

6. An article as claimed in claim 5, wherein at least one line of weakness is provided by a groove of a reduced thickness of the strip or panel in a localized manner.

7. An article as claimed in claim 1 wherein said leg encircling portion further includes means for fastening said leg encircling portion about said foreleg.

8. An article as claimed in claim 7 wherein said fastening means includes a belt, a loop, and a buckle.

9. An article as claimed in claim 1 wherein said panels are substantially identical so as to be interchangeable and easily replaceable.

10. An article of protective equipment for horses, ponies and the like comprising:
   a boot adapted to be worn on a lower portion of a foreleg thereof;
   a leg encircling portion; and
   a skirt portion comprising a plurality of strips or panels, said skirt portion depending from the leg encircling portion, said strips or panels being initially formed separately and a desired number thereof are assembled to form said skirt portion, said separate strips or panels including upper portions fastened together to form said leg encircling portion; and
   loops and apertures provided on said upper portions, each loop projecting through an aperture of a neighbouring strip or panel upper portion; and
   a strap or elongated fastening means for passing through the projecting loops.

11. An article of protective equipment for horses, ponies and the like comprising:
   a boot adapted to be worn on a lower portion of a forleg thereof;
   a leg encircling portion;
   a skirt portion comprising a portion of strips or panels, said skirt portion depending from the leg encircling portion, said strips or panels being arranged in overlapping side-by-side relationship to one another and being formed separately, each strip having an upper portion provided with a loop and an aperture, the loop of one strip or panel projecting through the aperture of the neighbouring strip or panel, each upper portion being provided with a lip portion and an upper edge portion, the lip portion of one strip or panel abutting the upper edge portion of the neighbouring strip or panel.

12. An article of protective equipment for horses, ponies and the like, comprising:
   a boot adapted to be worn on the lower portion of a foreleg therof;
   a leg encircling portion; and
   a skirt portion depending from said leg encircling portion, comprising a plurality of overlapping panels, said overlapping panels including an abutting lip portion and upper edge portion to prevent movement between said overlapping panels.

13. An article of protective equipment for horses, ponies, and the like, comprising:
   a boot adapted to be worn on a lower portion of a foreleg thereof;
   a leg encircling portion; and
   a skirt portion depending from said leg encircling portion comprising a plurality of panels, said panels having a generally offset configuration including raised and lowered ends, said panels overlapping so that a raised end overlaps a lowered end.

14. A method for forming an overreach boot for a foreleg of a horse comprising the steps of:
   providing a plurality of panels, each of said panels having a generally offset, elongated ooniguration;
   assembling said panels in an overlapping configuration thereby forming a skirt portion having first and second ends;
   fastening together said panels about said first end of said skirt portion thereby forming a leg encircling portion, whereby the second end of said skirt portion is left hanging loosely thereby allowing unhindered movement of said foreleg.

* * * * *